Jan. 17, 1928.

H. L. HUNTER 1,656,438

TEMPLOMETER

Filed March 1, 1926

Inventor:
Hugh L. Hunter,
by Robert Burns
Atty.

Patented Jan. 17, 1928.

1,656,438

UNITED STATES PATENT OFFICE.

HUGH L. HUNTER, OF CHICAGO, ILLINOIS, ASSIGNOR TO UHLEMANN OPTICAL CO., OF CHICAGO, ILLINOIS, A CORPORATION OF ILLINOIS.

TEMPLOMETER.

Application filed March 1, 1926. Serial No. 91,450.

This invention relates to measuring instruments adapted for convenient use by optometrists, and opticians in taking measurements for an accurate fitting of an ophthalmic mounting for an individual patron, and has for its object:

To provide a simple and effective structural formation and combination of parts in a measuring instrument of the type above set forth, whereby the accurate measurements of the various portions of a human head are obtained in a rapid and convenient manner, all as will hereinafter more fully appear.

In the accompanying drawing.

Like reference numerals indicate like parts in the different views.

Figure 1:
Fig. 1, is a perspective view of the instrument illustrating an adjustment of the parts for taking measurement of the length required in the temple bows of the spectacle type of ophthalmic mountings for an individual being fitted.
Figure 2:
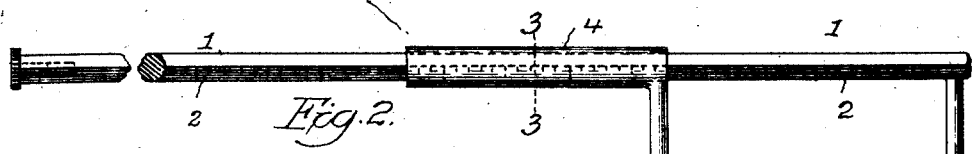
Fig. 2, is a side elevation of the instrument.
Figure 3:
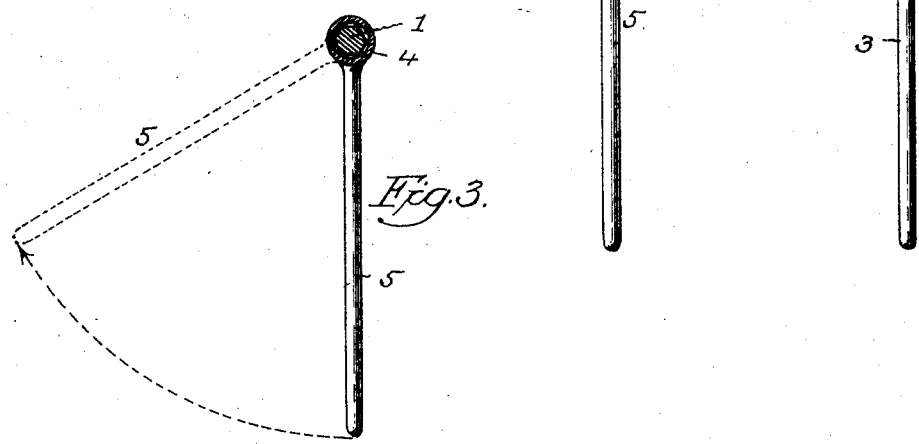
Fig. 3, is a transverse section on line 3—3 Fig. 2.

As shown in the drawing, the staff 1 of the instrument is of the straight bar form preferably, polygonal in transverse section, and with the respective faces of the bar impressed with complementary graduations or scales 2. At one end the staff 1, a jaw 3 of an elongated bar type is fixedly attached in right-angle relation to the staff and constitutes the fixed measuring jaw of the instrument.

Fitting the staff 1 in both a close sliding and revoluble manner is a sleeve 4 provided at one end with a jaw 5, also of an elongated bar type in right-angle relation to the sleeve and constituting the movable measuring jaw of the instrument.

With the described construction, the movable or adjustable jaw 5 can be turned in a plane parallel with the plane in which the fixed jaw is located, so as to be readily and accurately adjusted to take the different measurements, in fitting a pair of spectacles or the like for an individual use, such for instance as the required length in the temple bows, the pupillary distance between the eyes, the width of the nose bridge of the individual, the proper width between the temple bows, etc.

Having thus fully described my invention, what I claim and desire to secure by Letters Patent, is:—

1. In a templometer of the type described, the combination of a straight staff formed and adapted to receive a plurality of graduated scales along its length, a measuring jaw of the bar type fixed on an end of the staff, a sleeve slidingly and revolubly mounted on the staff, and a measuring jaw of the bar type fixed on said sleeve.

2. In a templometer of the type described, the combination of a straight staff of a polygonal shape in cross-section adapting the staff to receive complementary graduated scales on its respective faces, a measuring jaw of the bar type fixed on an end of the staff, a sleeve slidingly and revolubly mounted on the staff, and a measuring jaw of the bar type fixed on said sleeve.

Signed at Chicago, Illinois, this 25th day of February 1926.

HUGH L. HUNTER.